United States Patent [19]
Jefferies et al.

[11] Patent Number: 5,898,391
[45] Date of Patent: Apr. 27, 1999

[54] VEHICLE TRACKING SYSTEM

[76] Inventors: James Jefferies, 1130 East Cota, Santa Barbara, Calif. 93103; D. Scott Christie, 440 Front St., Weymouth, Mass. 02188

[21] Appl. No.: 08/970,590

[22] Filed: Nov. 14, 1997

Related U.S. Application Data

[63] Continuation of application No. 08/582,255, Jan. 3, 1996, abandoned.

[51] Int. Cl.[6] .................................................. G08G 1/123
[52] U.S. Cl. ........................ 340/988; 340/426; 342/457
[58] Field of Search ................................. 340/426, 988; 342/457, 357; 180/287; 307/10.2

[56] References Cited

U.S. PATENT DOCUMENTS

| | | | |
|---|---|---|---|
| 4,651,157 | 3/1987 | Gray et al. | 342/457 |
| 5,223,844 | 6/1993 | Mansell et al. | 342/457 |
| 5,334,974 | 8/1994 | Simms et al. | 340/988 |
| 5,497,149 | 3/1996 | Fast | 340/988 |
| 5,515,043 | 5/1996 | Bernard et al. | 340/426 |

FOREIGN PATENT DOCUMENTS 0242099  10/1987  European Pat. Off. ............ 340/426

Primary Examiner—Brent A. Swarthout
Attorney, Agent, or Firm—Morrison Law Firm

[57] ABSTRACT

A vehicle alarm system includes a receiver transmitter subsystem, a G.P.S. subsystem for locating a position and a control CPU. The CPU performs a log and locate function in which it logs a first position of the vehicle once during an armed state of an alarm system and then, in response to the passage of a certain time interval, locates the position again. If the position of the vehicle has changed during the alarm of the alarm system, the vehicle's position is transmitted via the receiver/transmitter subsystem to a security response center that can then receive tracking information and locate the vehicle.

5 Claims, 2 Drawing Sheets

VEHICLE TRACKING SYSTEM

This application is a continuation of application Ser. No. 08/582,255, filed Jan. 3, 1996, now abandoned.

BACKGROUND OF THE INVENTION

The present invention relates to car theft systems having the ability to locate cars whose unauthorized movement indicates theft. More specifically, the present invention relates to the use of automatic two-way paging or cellular telecommunications in combination with G.P.S. global positioning systems to provide for automated notification to police agencies of unauthorized movement and the subsequent location of vehicles.

Known are systems for reporting the positions of stolen vehicles, that employ two-way communication using cellular phones. Such systems suffer from the problem of undue expense and imprecision in their self-locating ability. For example, in a patent granted to Sheffer U.S. Pat. No. 4,891,650, there is disclosed a system for determining a location of a selected vehicle from which an alarm signal is generated. The vehicle is located by relative ranging from multiple cellular sites. The vehicle can be located within a cellular zone by arculation of the signals from cell sites that have the highest signal strength. One disadvantage of this system is that the unauthorized movement of a vehicle must be detected using conventional intrusion detection system. When an intrusion is detected, a digital communication is activated to transmit an alarm signal through a cellular transceiver in the vehicle. There is no provision for determining if a movement of the vehicle apart from detectable unauthorized entry of the vehicle has occurred. These systems also suffer from an inability to track the vehicle precisely even after their unauthorized movement has been reported.

Another system that requires unauthorized movement of a vehicle to be detected, and notice to be given, before tracking begins, is a homing system used by police departments. Such systems suffer from costliness, and lack of availability in many locations. They must be triggered by the police after the vehicle's theft or unauthorized movement is detected. The time lag between the detection of unauthorized movement and the ability of police to locate the vehicle may be critical. The vehicle's on-board homing signal has only a 1 mile effective range. The expensive equipment for detecting the homing signal must be purchased by the police department and is therefore not available in all areas. The in-vehicle system does not provide any means for detecting whether a movement of the vehicle has occurred or whether the vehicle's movement is unauthorized. The vehicle must be reported to the police as stolen before tracking begins. This requirement can be time-consuming and lower the chance of recovery.

Cellular phone systems, such as covered by U.S. Pat. No. 5,223,844 to Mansell are expensive and operable only where cellular service is available. In addition, the system shown by Mansell can not provide for automatic detection of unauthorized movement of the vehicle. Mansell discloses a system in which a vehicle's position is determined by an on-board G.P.S. position detection system. Position data are transmitted via a cellular telephone link to a control center for tracking. Again, as in other prior art systems, the unauthorized movement of the vehicle can not be detected.

With the availability of G.P.S. (available globally) and two-way paging, which uses subchannels of the transmissions of FM radio stations, the control channels necessary to implement the stolen car location and retrieval can be implemented universally using low cost existing technology.

SUMMARY OF THE INVENTION

The present invention provides G.P.S. receiver 2-way pager and alarm system. When a G.P.S. system is armed and loaded, the location of a vehicle can be tracked by sending vehicle coordinates through a two-way paging link or a cellular telecommunications link to a base station. An important feature of the invention is the low power requirement. When the vehicle is moved 1000 ft or more without authorization by the user, the G.P.S. wakes up and transmits its current status and position via the telecommunications link. The G.P.S. system, which uses a great deal of power, sleeps most of the time and only relates position information when needed.

Briefly, a vehicle alarm system includes a receiver transmitter subsystem, a G.P.S. subsystem for locating a position and a control CPU. The CPU performs a log and locate function in which it logs a first position of the vehicle once during an armed state of an alarm system and then, in response to the passage of a certain time interval, locates the position again. If the position of the vehicle has changed during the alarm of the alarm system, the vehicle's position is transmitted via the receiver/transmitter subsystem to a security response center that can then receive tracking information and locate the vehicle.

According to an embodiment of the present invention, there is provided, a security system, comprising: a vehicle subsystem including an on-board receiver/transmitter capable of receiving data encoding data representing messages and control commands, a CPU including means for implementing control functions according to the control commands or alternatively outputting messages, the CPU including a status register, a G.P.S. subsystem for indicating a position of the vehicle. A non-volatile memory containing a program executable by the CPU for logging the position and periodically comparing the logged location of the vehicle with a current location of the vehicle and the CPU having means for updating the status register to indicate an alarm situation based on the comparing.

According to another embodiment of the present invention, there is provided, a security method comprising: logging a position of a vehicle, storing the logged position in a memory at the beginning of an alarm state of a security system, locating a current position of the vehicle during the alarm state, initiating an alarm condition upon comparing the logged position with the current position, transmitting the alarm status of the vehicle and the position responsively to the alarm state.

According to yet another embodiment of the invention, there is shown a method of logging a position of a vehicle, storing the logged position in a memory at the beginning of an armed state of a security system, locating a current position of the vehicle during the armed state, initiating an alarm condition of the security system upon comparing the logged position with the current position, transmitting the alarm status of the vehicle and the current position responsively to the alarm condition.

The above, and other objects, features and advantages of the present invention will become apparent from the following description read in conjunction with the accompanying drawings, in which like reference numerals designate the same elements.

LIST OF FIGURES

DETAILED DESCRIPTION OF THE PREFERRED EMBODIMENTS

Figure 1:
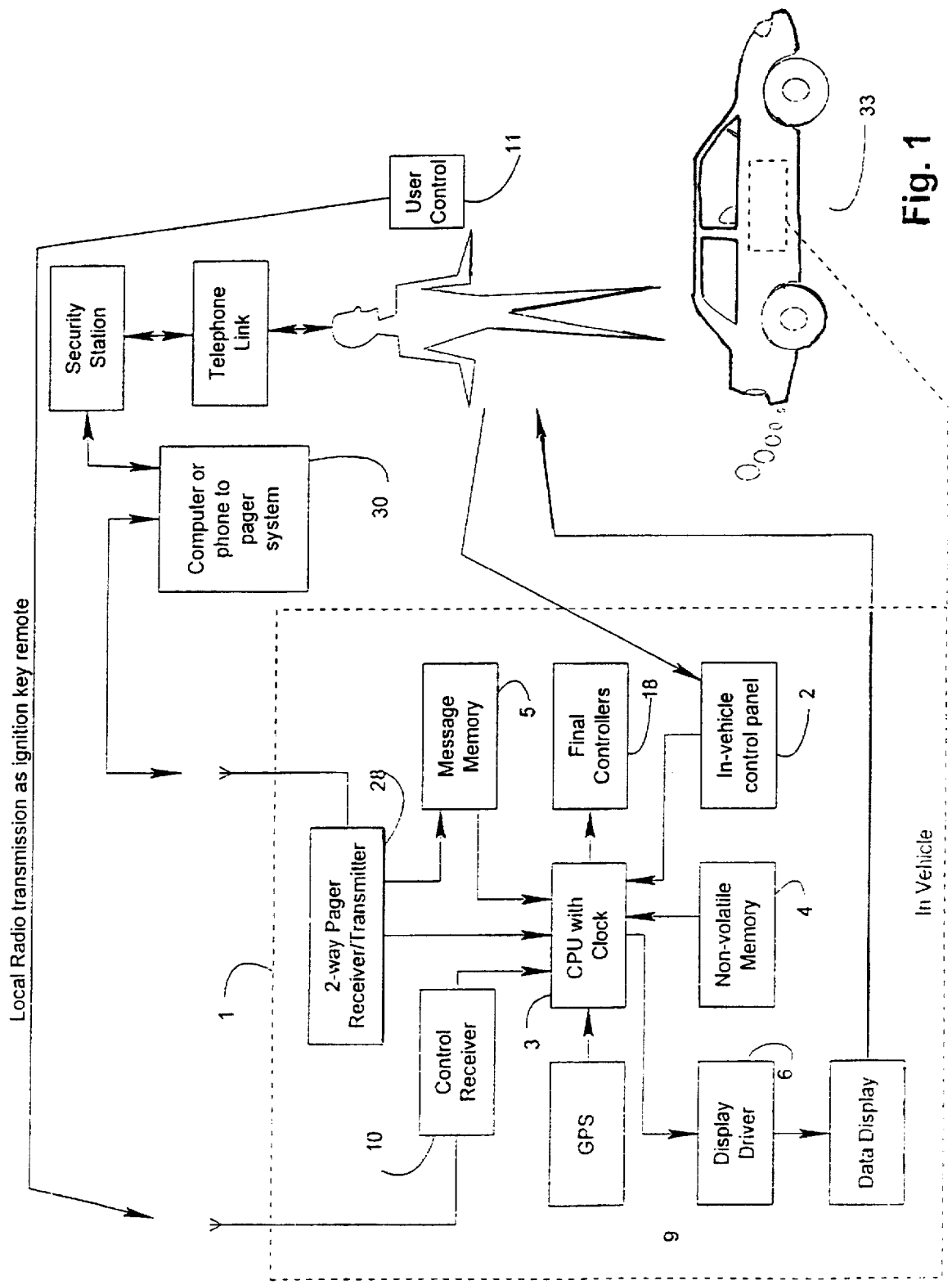
FIG. 1 is a schematic diagram of a first embodiment of a security control system for a vehicle.

Referring to FIG. 1, a security system for a vehicle according to a first embodiment of the invention includes an on-board subsystem 1 that includes an in-vehicle control panel 2 with a keypad (not shown) for inputting control commands to an on-board programmable CPU 3. CPU 3 is equipped with non-volatile 4 and volatile memory 5, both of which can be addressed directly by CPU 3. CPU 3 drives a data display 7 through a display driver 6. Data display 7 outputs data received from a receiver transmitter 8 (in the preferred embodiment, this can be either a cellular telephone or an asynchronous half duplex system such as a two-way pager terminal) or a G.P.S. satellite location system 9. A remote control receiver communicates with a hand-held remote control such as a key-chain remote control for arming and disarming the vehicle security system.

The layout of such systems is described in greater detail in U.S. Pat. No. 5,223,844 patent to Mansell, the entirety of which is incorporated herein by reference.

The interaction of elements of the present invention provides for the ability of the vehicle subsystem itself to determine if an unauthorized movement of the vehicle has taken place. A log and locate function is provided in a program stored in non-volatile memory 4. CPU 3 runs the log and locate program continuously. CPU 3 generates a periodic request to the G.P.S. system for position information, for example every 15 minutes. This position information is stored in volatile memory 5. A status register inside CPU 3 indicates if an alarm state is armed by a command from the in-vehicle control panel, a command received from the receiver/transmitter 8, or a command from the control receiver 10. If the position information provided from the G.P.S. subsystem changes while the CPU status register indicates the status of the system is armed, say a movement of 1000 feet or more, the status of the system goes to alarm. Then a phone number or pager ID is output to the receiver transmitter and a security station is contacted. Continuous status and position updates are provided to allow immediate tracking of the vehicle by police or other emergency crews. The latter condition is called the locate function as distinguished from the log function.

The status and position information, of course, can be relayed to any destination addressable by transmitter/receiver 28. Thus, the on-board system could contact the vehicle owner instead of a security station. Another way to use the position reporting ability is for the owner of the vehicle to call receiver/transmitter 28 and transmit a command requesting position information from the G.P.S. subsystem. This information can then be transmitted to the owner through the telecommunications link (either a cellular telephone link, or a two-way pager link).

Subscription cost of the system can be reduced using the following feature of the invention. To allow the two way paging to be performed using a smaller number of asynchronous data channels, the pager ID cap code can indicate a large number of pagers installed in systems served by a single security station. Each message conveyed asynchronously by the cap code to all the vehicles indicated by the single cap code can contain a local 4 byte code indicating which individual one of the pager's addressed by the single cap code should copy the message or command. Copying refers to the conveying of a message from receiver/transmitter 28 to volatile memory 5 such that CPU 3 will see the message and act on it. If the message header indicates the message is information to be displayed, the CPU drives display driver 6 to output a message on data display 7. If the message contains a control function, the CPU drives final controllers to perform various functions such as starting the engine or initiating an internal alarm state that could cause an engine ignition kill to disable the vehicle.

Figure 2:
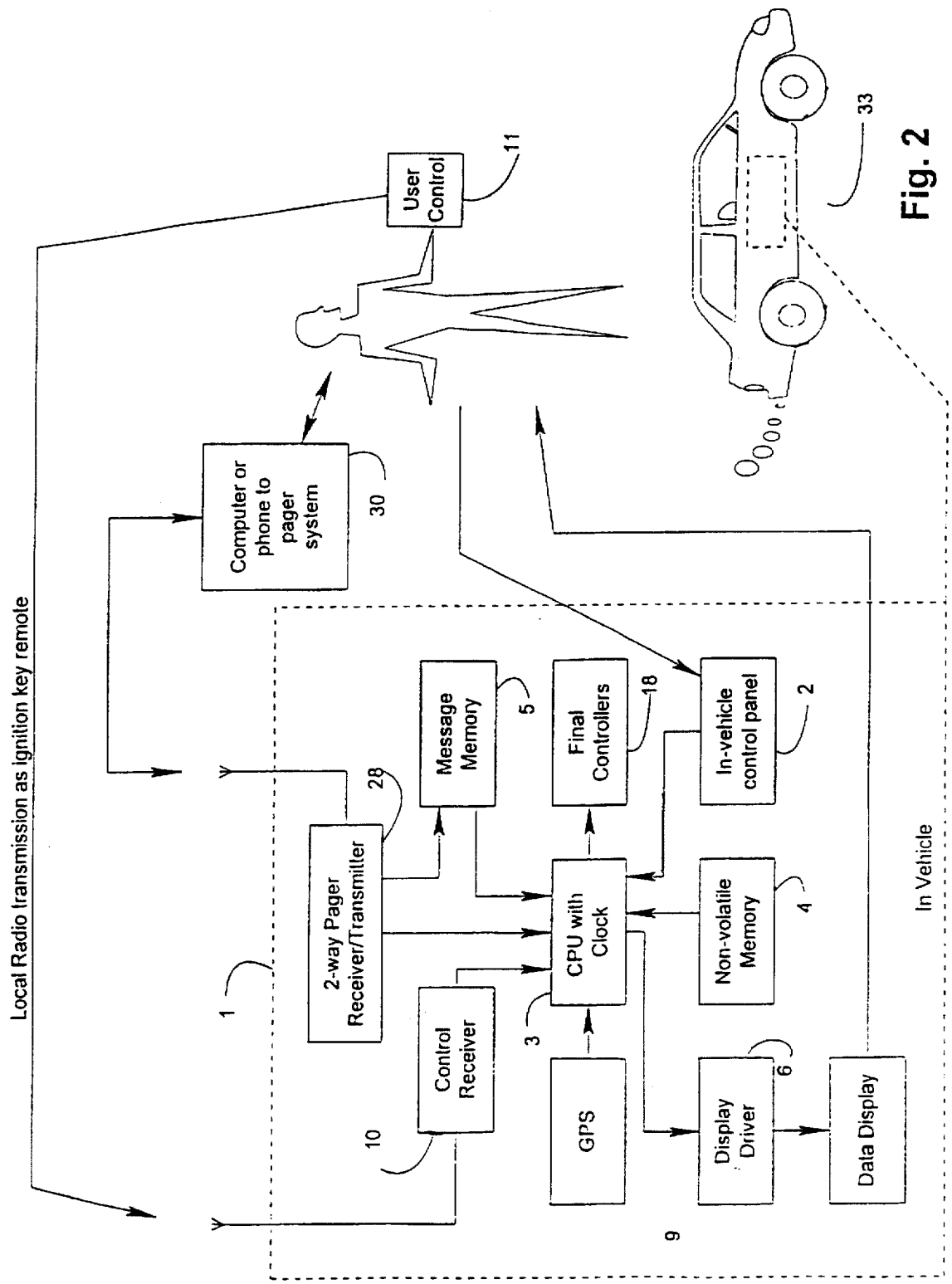
FIG. 2 is a schematic diagram of a second embodiment of a security control system for a vehicle.

Referring now to FIG. 2, another embodiment of the invention allows the user to communicate directly to the pager or cell phone without sending messages to a security station. Control or information messages are transmitted directly to the receiver transmitter by addressing the cell phone or 2-way pager link through a computer modem or a hand held 2-way pager by the user. The same functionality could be provided using the same type of message coding as described above with reference to FIG. 1.

Because the transmitter and receiver 8 can send information to the user or security station, the vehicle status or position can be transmitted to locate the vehicle.

The paging receiver receives data that originates from a telephone or modem of a computer employing well-known technology. Message data received by the pager is decoded and placed in shift registers to achieve a parallel format, permitting the data to be addressed directly by the CPU.

A user interface module accepts user data from activities of the user. For example, if the user arms the local alarm, the CPU initiates a position identification sequence using the G.P.S.. This position information is stored in the CPU memory until a log command from the pager is received. If the position has changed since the last logged position without disarming the alarm, the vehicle is assumed to be stolen and vehicle tracking is begun.

Besides polling the G.P.S. subsystem, the user can also perform the following control functions and others by addressing CPU 3 through a cellular telecommunications or two-way pager link. Control function that can be implemented include: Lock and unlock vehicle, start engine, warm seat, in-vehicle navigation, 2-way coverage 260+ cities, self-triggered by alarm function, sleep mode with periodic wake up, log, and locate, headlight-on/off, audible alarm sound, auto door lock, shock sensor.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A security system for a vehicle, comprising:

a vehicle subsystem including an on-board receiver/transmitter capable of receiving data encoding messages and control commands via a two-way paging system;

a CPU including means for implementing control functions according to said control commands or alternatively outputting messages;

said CPU including a status register;

a G.P.S. subsystem for indicating a position of said vehicle when said security system is armed prior to sensing alarm situation;

a non-volatile memory containing a program executable by said CPU for logging said position as determined by said G.P.S. subsystem and comparing said logged location of said vehicle with a current location of said vehicle as determined by said G.P.S subsystem at predetermined time intervals; and said CPU having means for updating said status register to indicate said alarm situation based on said comparing; and said G.P.S. subsystem transmitting said current position of said vehicle only in response to one of said alarm situation and a user command to indicate said position, whereby an onboard power source powering said security system is conserved.

2. A security system according to claim 1, wherein:

said CPU includes means for conveying a location of said vehicle from said G.P.S. subsystem to said receiver/transmitter to a user located remote from said vehicle.

3. A security system according to claim 1, further comprising:

means for arming said security system which causes said CPU to execute said program to perform said comparing.

4. A security system according to claim 1, further comprising:

means for addressing multiple receiver/transmitters in addition to said on-board receiver/transmitter using a single umbrella cap code;

means for addressing said on-board receiver/transmitter using a single portion of a message transmitted under said umbrella cap code such that only said on-board receiver/transmitter copies and responds to said message.

5. A security method for a vehicle, comprising:

logging a position of a vehicle;

storing said logged position in a memory at a beginning of an armed state of a security system;

locating a current position of said vehicle during said armed state prior to sensing an alarm condition at predetermined intervals, using a G.P.S. system;

initiating said alarm condition of said security system upon a comparison of said logged position with said current position as determined by said G.P.S. system indicating a positional change exceeding a certain distance; and transmitting an alarm status of said vehicle and said current position only in response to said alarm condition, via a two-way paging system, whereby an onboard power source powering said security system is conserved.

* * * * *